US008626215B2

(12) United States Patent
Persson et al.

(10) Patent No.: US 8,626,215 B2
(45) Date of Patent: Jan. 7, 2014

(54) RADIO NETWORK CONTROLLER AND RADIO NETWORK CONTROLLER ASSEMBLY

(75) Inventors: Bengt Persson, Bromma (SE); Stefan Wahlman, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 13/029,618

(22) Filed: Feb. 17, 2011

(65) Prior Publication Data

US 2012/0208579 A1    Aug. 16, 2012

(51) Int. Cl.
*H04B 7/00* (2006.01)

(52) U.S. Cl.
USPC .................. 455/507; 455/561; 455/562.1

(58) Field of Classification Search
USPC .............. 455/436, 439, 432.1, 434, 440, 442,
455/445, 450, 452.1, 437, 446, 444, 422.1,
455/423, 524, 525, 560, 561, 562.1, 507;
370/335, 338, 312, 328–331, 349, 337,
370/341, 443, 389, 395.1, 395.31, 395.32,
370/395.52, 3, 95.51, 235
See application file for complete search history.

(56) References Cited

U.S. PATENT DOCUMENTS

| 7,394,795 | B2 * | 7/2008 | Chitrapu et al. | 370/338 |
| 7,489,672 | B2 * | 2/2009 | Chitrapu et al. | 370/342 |
| 7,505,431 | B2 * | 3/2009 | Chitrapu et al. | 370/331 |
| 8,340,680 | B2 * | 12/2012 | Puthenpura et al. | 455/453 |
| 2005/0026616 | A1 * | 2/2005 | Cavalli et al. | 455/436 |
| 2005/0213555 | A1 | 9/2005 | Eyuboglu et al. | |
| 2007/0254671 | A1 | 11/2007 | Liu | |
| 2008/0242224 | A1 * | 10/2008 | Fratti et al. | 455/3.06 |
| 2011/0158332 | A1 * | 6/2011 | Wu et al. | 375/259 |
| 2012/0020330 | A1 * | 1/2012 | Calcagno et al. | 370/335 |

FOREIGN PATENT DOCUMENTS

| EP | 1737256 A1 | 12/2006 |
| WO | 2005115026 A2 | 12/2005 |

* cited by examiner

*Primary Examiner* — Sujatha Sharma
(74) *Attorney, Agent, or Firm* — Coats & Bennett, PLLC

(57) ABSTRACT

It is presented a radio network controller assembly for controlling base stations. The radio network controller assembly comprises: a plurality of unit radio network controllers, wherein each unit radio network controller comprises: a set of external interfaces configured for interaction with a core network, base stations and other radio network controllers; and a set of internal interfaces, distinct from the set of external interfaces, configured at least for interaction with peer unit radio network controllers belonging to the radio network controller assembly. The radio network assembly further comprises a database arranged to store configuration data comprising mappings of each base station to one of the plurality of unit radio network controllers. The radio network controller assembly is arranged to use the set of external interfaces for communication with the plurality of base stations, the core network and other radio network controllers external to the radio network controller assembly.

9 Claims, 3 Drawing Sheets

RADIO NETWORK CONTROLLER AND RADIO NETWORK CONTROLLER ASSEMBLY

RELATED APPLICATIONS

This application claims priority to International Patent Application No. PCT/SE2011/050157, filed Feb. 14, 2011 and incorporated by reference herein in its entirety.

TECHNICAL FIELD

The invention relates to radio network controllers in mobile communication networks.

BACKGROUND

A radio network controller (RNC) is a node in mobile communication networks for controlling several base stations. Base stations are also known as base transceiver stations, node Bs or enhanced node Bs in various standards. Each base station controls at least one radio cell within which mobile communication equipment gains access to the mobile communication network. The RNC is typically provided with interfaces interacting with its base stations, other RNCs and a core network of the mobile communication network.

Controlling a large number of base stations from a single controlling node, e.g. an RNC, is preferable from many aspects. Typically, the most important aspects are node and network administration efficiency, e.g. less border maintenance, simple network expansion, reduced risk for impacts from changes within the area to spread to other nodes. Other positive aspects of such a configuration are improved hardware efficiency and improved control of the radio network. The latter is due to reduction of border areas between neighbouring RNCs, where control tend not to be optimal. The improved hardware is mainly due to increased resource pool size thus improved response times and geographic load distribution.

However, building and managing a radio network with large controlling nodes is also complex, due to complex controlling nodes, possible expansion limited to what the node's initial design allows, complex hardware generation shift and very large failure areas in case of node failures.

Therefore, in practice, the result is often a compromise, with the size of the radio network attached to each controlling node selected to be less than the optimal size from an operational or efficiency point of view.

It would be very useful if there was a way to design an RNC with the advantages but not the disadvantages of controlling a large number of base stations.

SUMMARY

An object of embodiments herein is to provide a radio network controller with greater capacity and flexibility than a conventional radio network controller.

A first embodiment provides a unit radio network controller for use in a radio network controller assembly and configured for control of plurality of base stations, each base station controlling at least one radio cell. The unit radio network controller comprises: a set of external interfaces configured for interaction with a core network, at least one base station and other radio network controllers. The unit radio network controller further comprises: a set of internal interfaces, distinct from the set of external interfaces, the set of internal interfaces being configured at least for interaction with peer unit radio network controllers belonging to the radio network controller assembly.

Using such a unit radio network controller, arranged to be part of a radio network controller assembly, a flexible structure of unit radio network controllers can be provided. The internal interfaces are free to be designed as desired to improve efficiency etc., without being bound to telecommunication standards, as is the case for external interfaces. Furthermore, using such a radio network assembly provides an efficient way to adjust capacity.

The set of internal interfaces may further comprise an interface for interaction with a database belonging to the radio network assembly, the database storing configuration data comprising mappings of each base station and one of the unit radio network controllers of the radio network assembly.

The internal interfaces may be simpler than the external interfaces. For example, the internal interfaces may be free to make use of TCP/IP (Transport Control Protocol/Internet Protocol) as a communication mechanism instead of SS7 (Signalling System #7). This allows handovers between unit radio network controllers of the same radio network controller assembly to be effected with greater ease and efficiency compared to handover between two radio network controllers using an official Iur interface.

A second embodiment is a radio network controller assembly arranged to control a plurality of base stations, each base station controlling at least one radio cell, the radio network controller assembly comprising: a plurality of unit radio network controllers according to the first embodiment; and a database arranged to store configuration data comprising mappings of each base station and one respectively associated unit radio network controller of the plurality of unit radio network controllers; wherein the radio network controller assembly is arranged to use the sets of external interfaces for communication with the plurality of base stations, the core network and other radio network controllers external to the radio network controller assembly.

Such a radio network controller assembly behaves like a single radio network controller to any external entities, while providing a flexible and efficient internal structure.

The configuration data may further comprise mappings between each radio cell and one respectively associated unit radio network controller.

The database may be comprised in one of the unit radio network controllers.

The database may be comprised in a device distinct from each of the unit radio network controllers.

Each unit radio network controller may comprise mobile device control functionality for any associated mobile devices.

Each unit radio network controller may be arranged to redirect traffic on an end user connection basis to another unit radio network controller for load management. In other words, base stations are assigned to one unit radio network controller and a new session is directed to the assigned unit radio network controller initially. However, if the assigned unit radio network controller is short of capacity, the session can be redirected dynamically to another unit radio network controller. This dynamic load management can be very valuable to increase efficiency.

One of the unit radio network controllers may be configured to be a singleton device, responsible for radio singleton functionality being network control functionality which is to be performed by only one unit radio network controller. For example certain SS7 signalling tasks should always be performed by the same unit radio network controller.

A second one of the unit radio network controllers may be configured to be a standby singleton device, arranged to take over radio network control functions which are tied to only one unit radio network controller when the singleton device is unable to continue to perform the singleton functionality.

A third embodiment is a radio network controller assembly configured for control a plurality of base stations, each base station controlling at least one radio cell. The radio network controller assembly comprises: a plurality of unit radio network controllers, wherein each unit radio network controller comprises: a set of external interfaces configured for interaction with a core network, base stations and other radio network controllers; and a set of internal interfaces, distinct from the set of external interfaces, the set of internal interfaces being configured at least for interaction with peer unit radio network controllers belonging to the radio network controller assembly. The radio network assembly further comprises a database arranged to store configuration data comprising mappings of each base station to one of the plurality of unit radio network controllers. The radio network controller assembly is arranged to use the set of external interfaces for communication with the plurality of base stations, the core network and other radio network controllers external to the radio network controller assembly.

It is to be noted that any feature of the first, second, or third embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
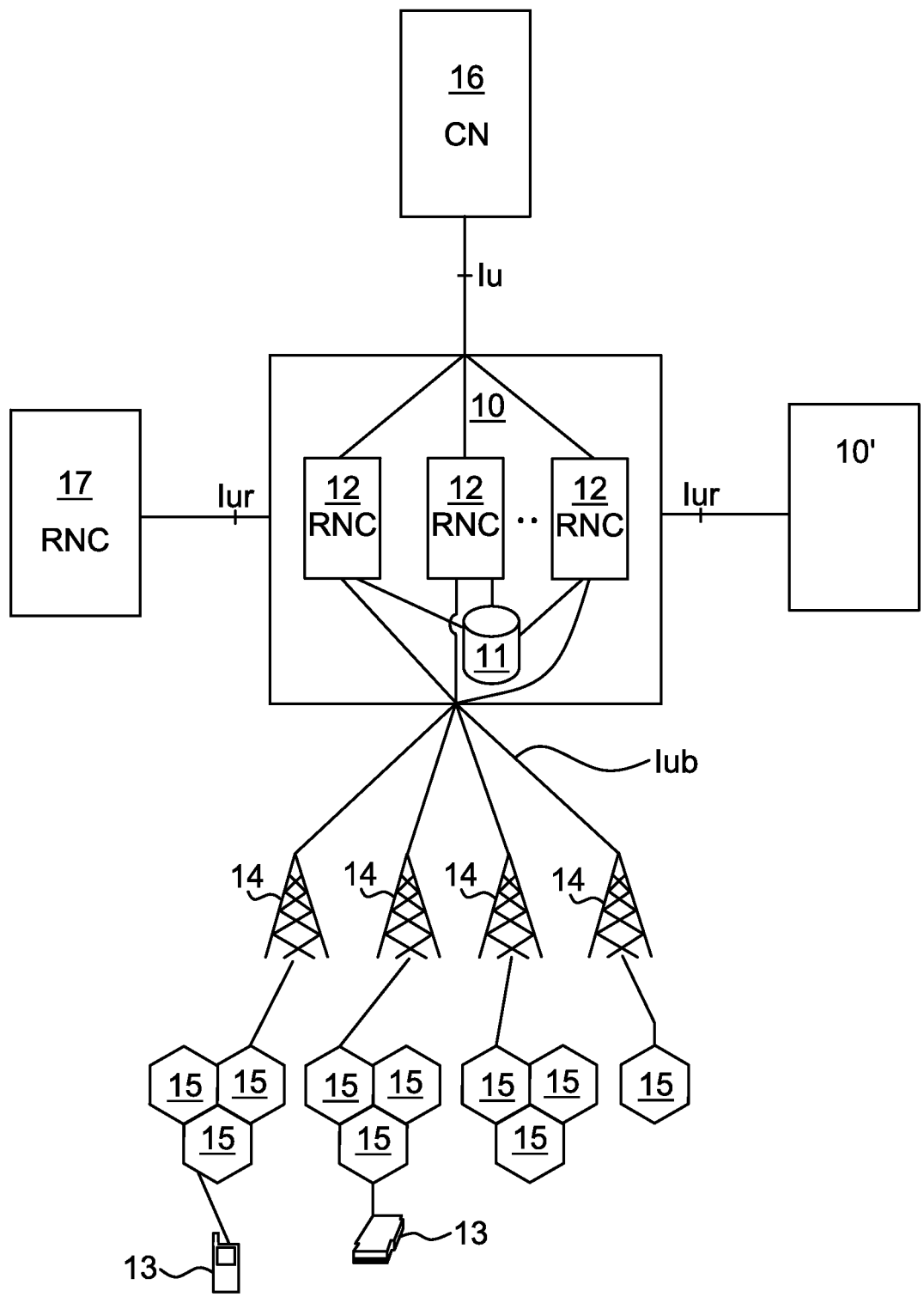
FIG. 1 is a schematic diagram showing an overview of a mobile communication network comprising an embodiment of an RNC assembly.

FIG. 1 is a schematic diagram showing an overview of a mobile communication network comprising an embodiment of an RNC assembly.

A core network 16 comprises central network elements (not shown) of the mobile communication network, such as SGSN (Serving GPRS (General Packet Radio Service) Support Node), MSC (Mobile Switching Center), MGW (Media GateWay). The core network 16 provides user data connectivity, billing, roaming capability, etc.

A conventional independent RNC 17 is connected to the core network 16 and controls a set of base stations (not shown). It is to be noted that when the term RNC is used herein, it is not tied to any particular standard, but rather refers to any device responsible for controlling a radio network for a geographic region of a mobile communication network.

Significantly, there is also provided an RNC assembly 10. The RNC assembly 10 comprises a plurality of unit RNCs 12 and a database 11. Optionally, the database 11 is provided in one of the unit RNCs 12, as is shown in FIG. 2c below. While the RNC assembly 10 is here shown with three unit RNCs 12, the RNC assembly 10 can contain any suitable number of unit RNCs 12. In fact, as will be explained in more detail below, one advantage of the structure of the RNC assembly 10 is the ease with which capacity can be adjusted by adding or removing individual unit RNCs 12. It is to be understood that herein a unit RNC is to be construed as any RNC that is part of an RNC assembly.

The RNC assembly 10 is connected to a plurality of base stations 14 under the control of the RNC assembly 10. Each base station 14, in turn, controls at least one radio cell 15, by which means mobile devices 13 gain access to the mobile communication network. The mobile devices 13 can be mobile phones and/or data access devices, e.g. with a USB connection for use with a computer.

The mobile communication network can optionally comprise another RNC assembly 10' controlling a separate set of base stations (not shown). The number of RNCs 17 and RNC assemblies 10, 10' of the mobile communication network is completely flexible and can be any suitable number as determined during network design, as long as there is at least one RNC assembly 10.

Returning to the RNC assembly 10, three interfaces are exemplified here: Iu for communicating with the core network 16, Iur for communicating with any external RNCs 17 or RNC assemblies 10' and Iub for communicating with the base stations 14. While the names for these interfaces correspond to the terminology of UMTS (Universal Mobile Telecommunications System), any equivalent interfaces of other standards, such as GSM (Global System for Mobile communication), CDMA (Code Division Multiple Access)-2000, TD(Time Division)-CDMA, etc, can be applied.

The external interfaces of the RNC assembly 10 are identical to those of the independent RNC 17, whereby to any external entity, the RNC assembly 10 behaves like an independent RNC 17. The RNC assembly 10 would expose e.g. one SS7 (Signalling System #7) signaling point code, or at least a small set of common set of signaling point codes, a single node id, one common set of IP addresses, etc.

Internally however, the RNC assembly 10 comprises several unit RNCs 12, whereby the capacity is greater than a regular RNC 17. Significantly, the capacity of the RNC assembly 10 is also substantially easier to alter. Each unit RNC 12 mainly operates as an independent node when it comes to managing its own resources and devices, and controlling its base stations, cells or mobile devices. Furthermore, each unit RNC 12 can have its own node configuration data such as software version and/or hardware configuration.

Optionally, one or more of the unit RNCs 12 also have the ability to operate as a single RNC, like the independent RNC 17.

The database 11 stores configuration data comprising mappings of each base station 14 and one of the unit RNCs 12 of the radio network assembly 10. In other words, each base station 14 is coupled to one of the unit RNCs 12. Optionally, each unit RNC 12 can be arranged to redirect traffic on an end user connection basis to another unit RNC 12 for load management. This allows for dynamic load management, particularly if a unit RNC 12 is at, or close to, its capacity limit.

Optionally, in a similar way to the base station mappings, the database can also store configuration data comprising mappings of each radio cell 15 and one of the unit RNCs 12 of the radio network assembly 10.

Whenever there is communication from mobile devices 13 and data that needs to be updated, data in the database 11 is updated. One way to distribute updates to individual unit RNCs is for each unit RNC 12 to subscribe to any database modifications relating to its area of responsibility.

There are several options of how the RNC assembly 10 is set up. A first option is that each unit RNC 12 has a pre-configured list of all unit RNCs 12 in the RNC assembly 10 and announces itself upon installation. A second option is that each unit RNC 12 receives a pre-configured id of an RNC assembly 10 and a unit RNC 12 identification to be used whereby a broadcast mechanism is used to find the other unit RNCs 12. A third option is that each unit RNC 12 receives a pre-configured id of an RNC assembly 10 and a unit RNC 12 identification to be used by contacting and announcing itself to a server maintaining data defining the RNC assembly 10. Regardless of the mechanism used, any change in the set of active or configured set of unit RNCs 12 should be made available to all unit RNCs 12 to allow prompt actions.

The database 11 can thus store all radio network data in one location, which is propagated to relevant unit RNCs 12 to allow fast access to data in each unit RNC 12. The radio network data is mostly needed at set-up of the base stations 14 and cells 15, with its communication links, cell parameters, handover criteria etc. That data is made available to the unit RNC 12 controlling the base station 14, or cell 15, in question. Also, mobile network operator specific data can be stored in the database and propagated in the same way.

Since the unit RNCs 12 only need to conform to telecom standard communication (Iu, Iub, Iur in this case) for external communication, not internal communication, interfaces within elements of the RNC assembly 10 can be made simpler. In fact, using the database 11, various state information can be made available to all unit RNCs 12 of the RNC assembly 10. Making such data available to the unit RNCs 12 removes the RNC assembly internal need for many messages and elaborate mechanisms of the Iur interface for RNC to RNC communication, e.g. during handover. Furthermore, TCP/IP (Transport Control Protocol/Internet Protocol) can be used for internal communication instead of SS7. So for example, when a mobile device 13 shifts from one unit RNC 12 to another unit RNC 12 of the same RNC assembly 10, the handover is effected with greater ease and efficiency compared to between two RNCs 17 using the official Iur interface.

Additionally, the capacity of the RNC assembly 10 is easily adjusted. In the prior art, if the capacity of an RNC 17 is insufficient, a new RNC needs to be installed and a large part of the base stations of the original RNC 17 need to be reconfigured to be assigned to the new RNC. This work is not only tedious but also takes a long time and can be risky in terms of network availability. Using the RNC assembly 10, however, expanding capacity is a simple matter of installing a new unit RNC 12 and updating the configuration in the database 11. All base stations 14 are still connected to the same RNC assembly 10 (which they see as a single RNC), whereby the base stations do not need to be reconfigured in any way. Reduction in capacity is also possible in an analogous way.

Moreover, the structure of the RNC assembly 10 allows for a heterogeneous unit RNC 12 environment. Since each unit RNC 12 can be assigned its own number of base stations, capacity does not need to be equal for each unit RNC 12. This extends the lifetime for individual RNCs 12 as they can still continue to function when new unit RNCs 12 of a new generation/greater capacity are installed in the same RNC assembly 10. In fact, the presented structure not only provides heterogeneity in terms of hardware, but also software. Consequently, software upgrades can be performed one unit RNC 12 at a time while temporarily reassigning base stations, to minimise or even eliminate downtime during such upgrades.

Optionally, the database 11 is structured such that each unit RNC 12 is able to identify which part of the database it needs to consider, as well as which interfaces it should terminate in normal operation. The database can also allow for any unit RNC 12 to check current status of all other unit RNCs 12 in the RNC assembly 10, including operational state, load, available capacity and identification of status on each interface external to the RNC assembly 10. In case of failure or maintenance of one of the unit RNCs 12, this allows another one of the unit RNCs 12 to step in and take over.

Figure 2A:
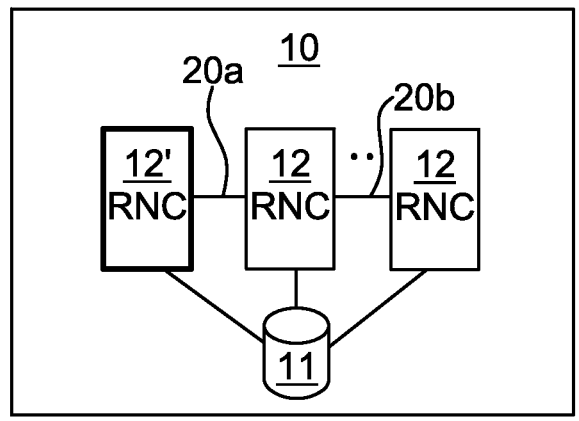
FIG. 2a is a schematic diagram showing an RNC assembly with one unit RNC being a singleton device.

FIG. 2*a* is a schematic diagram showing an RNC assembly with one unit RNC 12' being a singleton device. Singleton functionality can for example be required for certain SS7 functions or management of the database 11. The configuration of which unit RNC is the singleton device is stored in the database 11. The selection of which unit RNC to function as the singleton device can be performed using various principles such as: pre-configured priority, take-challenge, vote etc. In case a unit RNC being a singleton device disappears, another unit RNC can take over that singleton role. This may follow the same principles, with new selection or a standby was selected already at the first selection has to take place.

Some singleton devices 12' can be replaced using cold standby without disturbing operation of any of the unit RNCs, e.g. database ownership control. However, other such replacements will cause disturbance, e.g. handling of SS7 maintenance signaling. For the latter group it is highly advantageous to select a more or less active standby for the function at the initial selection.

The communication links of the internal interfaces 20*a-b* can be made secure and reliable (failsafe). The significance of this can be illustrated by effect of a hypothetical event where an internal communication link fails, while external interfaces still work. The RNC assembly 10 would then become separate RNC assemblies with the same ID. The external nodes connect to an arbitrary of one of them or fail to connect at all, which could result in a major loss of traffic. Failsafe internal communication, and/or split avoidance functions of the RNC assembly 10, will reduce this risk.

Figure 2B:
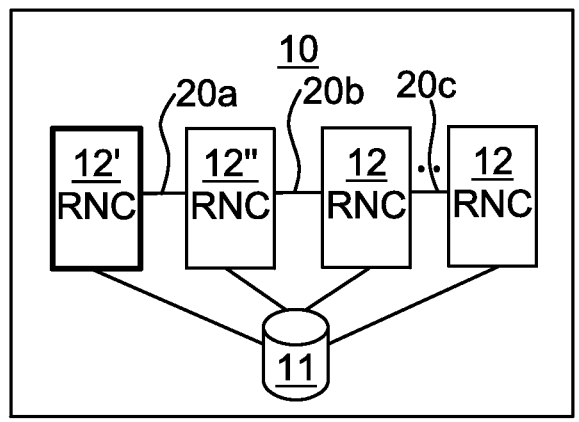
FIG. 2b is a schematic diagram showing an RNC assembly with two unit RNCs being singleton devices for different functions.
Figure 2C:
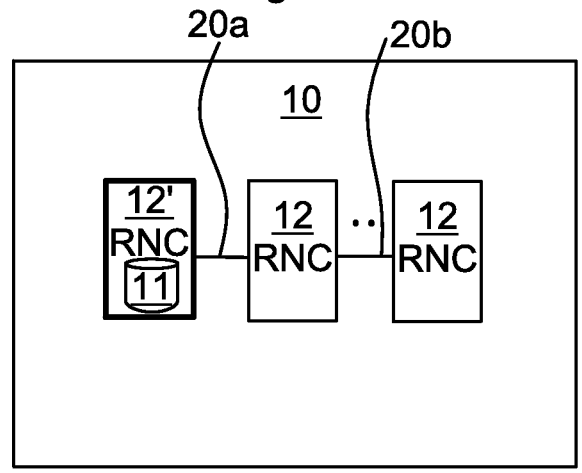
FIG. 2c is a schematic diagram showing an RNC assembly where a configuration database is comprised in a unit RNC.

It is to be noted that the internal interfaces 20*a-b* are only schematically shown in FIG. 2*a* (as well as in FIGS. 2*b-c*). For example, all unit RNCs can communicate with each other without communicating through any other RNC. The internal interfaces are there to allow communication between elements of the RNC assembly 10.

FIG. 2*b* is a schematic diagram showing an RNC assembly with two unit RNCs being singleton devices for different functions. For example, singleton SS7 functions can be handled by one unit RNC 12' while database management singleton functions can be handled by another unit RNC 12". This allows for better balancing of the load related to singleton tasks between unit RNCs.

FIG. 2c is a schematic diagram showing an RNC assembly where a the database 11 is comprised in a unit RNC 12'.

Here now follows a description of various call handling aspects with reference again to FIG. 1. The unit RNCs 12 support mobility and other traffic cases involving more than one unit RNC 12. To do that successfully, the information held by one unit RNC 12 is made available to other unit RNCs 12. As explained above, this can be done through distribution mechanisms of the database or through direct application interaction.

Different standards solves different issues in different ways, depending of what information is dynamic, included in signalling messages etc. Below follows some call cases as applicable to the 3GPP (3rd Generation Partnership Project) W-CDMA (Wideband CDMA) standard. Other standards are equivalent to the presented solutions when applicable.

Here now a scenario for outgoing calls in the RNC assembly 10. Firstly, to effect an outgoing call, paging is performed. The call arrives to the RNC assembly 10 using SS7 signalling to either a random unit RNC 12 or the unit RNC 12 owning this SS7 interface (as a singleton device).

The receiver unit RNC 12 of the page request needs to either send the request to all unit RNCs 12 or identify which unit RNCs 12 are effected and send only to those. Once the request has been received in those unit RNCs 12, the procedure is the same as in independent RNCs 17.

Once the mobile terminal 13 receives the paging, it sends a call request. The call request arrives to the unit RNC 12 owning the RACH (Random Access Channel) interface for the cell where the mobile terminal 13 is located. Typically, this same unit RNC 12 would own the whole base station 15 with all its broadcast and random access channels.

The unit RNC 12 can process the call request as a call owner in a way like an independent RNC 17.

When initiating signalling toward the core network 16 over SS7, an SS7 session is established by the RNC assembly 10. The unit RNC 12 can contain the SS7 session, in which case the unit RNC 12 has information on what session id it is allowed to use, or alternatively, the unit RNC 12 can forward the request to the interface owner (singleton device) and let that maintain the sessions.

Among the signalling information exchanged, is information on the user plane terminations for each end. The call owner submits identifiers for suitable port where to receive this data in its own unit RNC 12 and sends any user data with the destination identifiers received from core network 16.

All subsequent signalling on for this session follows the same path.

This procedure also applies when the mobile terminal 13 takes the initiative and also when the intention is only to set up a signalling bearer, e.g. for an SMS (Short Messaging Service) or LA (Location Area) update.

For mobility within a unit RNC 12, the procedures are the same as in independent RNC 17.

For mobility between unit RNCs 12, it is possible to use several different designs, involving the movement of different parts of the data for the users.

For users on dedicated channels (DCH, incl. high speed modes), a default solution would be to retain all user data at its original location, and to start interaction with cell and base stations controlled by another unit RNC 12. This is similar to the Iur interface is used between different independent RNCs. Those interactions are required whenever usage of resources by the base stations 15 changes due to mobility, channel switching, etc. and also whenever messages need to be sent to or from the base station 15 in question.

For users of FACH(Forward Access Channel)/RACH, the same principles apply by default, as the users often change between DCH and FACH. The additional aspect is that a user plane is located, with its cell responsibility, in another unit RNC 12. The user plane is between the DCH user context in the original unit RNC 12 and the broadcast channel termination.

However for both URA (UTRAN (UMTS Terrestrial Radio Access Network) Registration Area) and FACH there are special functions "Cell Update" and "URA Update", where the unit RNC 12 owning the cell where the update was made, forwards the request to the unit RNC 12 owning the user. The identity to be used for that purpose, RNTI (Radio Network Temporary Identifier), is therefore unique within the RNC assembly 10. Hence, it is provided a global RNTI search function within the RNC assembly 10 or a structured numbering scheme that all unit RNCs 12 are aware of.

Mobility between different RNC assemblies 10, 10', or an RNC assembly 10 and an independent RNC 17 is on the outgoing side, i.e. from where the owner of the mobile device 13 is currently located, to where the current cell is, is quite similar to the legacy solution. The only difference is that some additional effort is needed to find the external signalling interface if this is located in another unit RNC 12.

In the other direction, for incoming communication, this is one of the few cases where a signalling session is established to an RNC. For the RNC assembly 10, this session will be established on an arbitrary unit RNC 12, or the interface owning unit RNC 12. This implies that all subsequent messages are forwarded to the unit RNC 12 that owns the target cell, to establish the drifting context that couples the cell and user control. In this case, a method can be applied to reduce the number of cases where the interface owner and cell owner are separated. By allocating base stations interfacing a specific other RNC to the same RNC as the RNC owning the interface to said RNC, it is likely that interactions between unit RNCs 12 is significantly reduced.

There is one additional case of incoming SS7 sessions to an RNC assembly 10, which is the Incoming Core Network Hard Handover procedure. Also here, sessions and access in the signalling network is defined before the target unit RNC 12 has been identified.

Similar principles to the incoming Iur handover apply, i.e. the SS7 session is established in an arbitrary unit RNC 12, and an owning context is created, either with the cells or when target cell has been identified with the SS7 termination.

In many situations, load may vary significantly between the different unit RNCs 12. Some of the unit RNCs 12 may be overloaded while other has plenty of spare capacity.

As a key reason for having a big monolithic RNC in the prior art was to secure a big capacity pool for all traffic to share. One way to even out the load is to move base station responsibilities as described above. As this can result in disturbances, this is not advisable for short term fluctuations.

A simple way is to even out the load is to forward call requests (rrcRequest) from a unit RNC 12 which is overloaded, to a unit RNC 12 with spare capacity. The owner of the user is created in the unit RNC 12 with spare capacity despite the user being located in a cell owned by the overloaded unit RNC 12. The information has been transferred and connections been set up the situation becomes identical to the situation after mobility.

Figure 3:
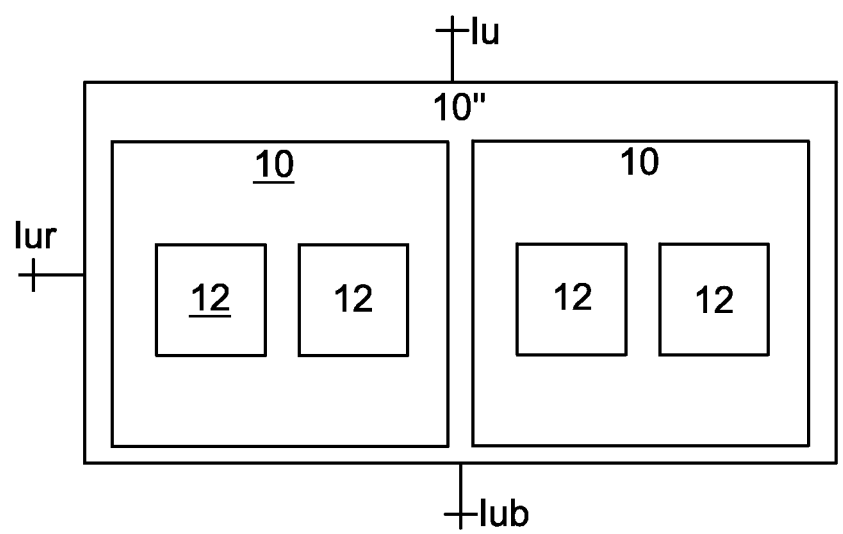
FIG. 3 is a schematic illustration of a hierarchy of RNC assemblies.

FIG. 3 is a schematic illustration of a hierarchy of RNC assemblies. Optionally, several RNC assemblies 10 can be grouped together to form a super RNC assembly 10". This type of hierarchy can be used in several levels to achieve desired capacity. Externally, the super RNC assembly 10" provides the same interfaces (Iu, Iur, Iub) as an individual RNC.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A radio network controller assembly configured to control a plurality of base stations, each base station controlling at least one radio cell, the radio network controller assembly comprising:
   a plurality of unit radio network controllers, each unit radio network controller comprising:
      a set of external interfaces configured for interaction with a core network, at least one base station, and at least one radio network controller; and
      a set of internal interfaces, distinct from the set of external interfaces, the set of internal interfaces configured at least for interaction with peer unit radio network controllers also comprised in the radio network controller assembly;
   a database configured to store configuration data comprising mappings of each base station and one respectively associated unit radio network controller;
   wherein the radio network controller assembly is configured to use said sets of external interfaces for communication with the plurality of base stations, the core network, and radio network controllers external to the radio network controller assembly; and
   external interfaces identical to those of an independent radio network controller;
   wherein one of the unit radio network controllers is a singleton device which owns a Signalling System #7 interface for the radio network controller assembly which is to be performed by only one unit radio network controller in relation to the core network.

2. The radio network controller assembly according to claim 1, wherein the configuration data further comprises mappings between each radio cell and one respectively associated unit radio network controller.

3. The radio network controller assembly according to claim 1, wherein the database is comprised in one of the unit radio network controllers.

4. The radio network controller assembly according to claim 1, wherein the database is comprised in a device distinct from each of the unit radio network controllers.

5. The radio network controller assembly according to claim 1, wherein each unit radio network controller comprises mobile device control functionality for any associated mobile devices.

6. The radio network controller assembly according to claim 1, wherein each unit radio network controller is configured to redirect traffic on an end user connection basis to another unit radio network controller for load management.

7. The radio network controller assembly according to claim 1, wherein one of the unit radio network controllers is configured to be a singleton device, responsible for radio singleton functionality comprising network control functionality, which is to be performed by only one unit radio network controller.

8. The radio network controller assembly according to claim 7, wherein a second one of the unit radio network controllers is configured to be a standby singleton device, arranged to take over network control functionality tied to the singleton device when that singleton device is unable to continue to perform the radio singleton functionality.

9. The radio network controller assembly according to claim 1, wherein the internal interfaces of any given unit radio network controller are simpler than the external interfaces of that given unit radio network controller in terms of the communication protocol employed.

* * * * *

UNITED STATES PATENT AND TRADEMARK OFFICE
CERTIFICATE OF CORRECTION

| | | |
|---|---|---|
| PATENT NO. | : 8,626,215 B2 | Page 1 of 1 |
| APPLICATION NO. | : 13/029618 | |
| DATED | : January 7, 2014 | |
| INVENTOR(S) | : Persson et al. | |

It is certified that error appears in the above-identified patent and that said Letters Patent is hereby corrected as shown below:

On the Title Page, below Item (65), insert Item -- (30) Foreign Application Priority Data
    February 14, 2011  (WO).............. PCT/SE2011/050157 --.

Signed and Sealed this
Eleventh Day of November, 2014

Michelle K. Lee
*Deputy Director of the United States Patent and Trademark Office*